May 16, 1967 B. I. GALITZKI ETAL 3,320,346
METHOD OF PRODUCING FABRIC LAMINATED ARTICLES
Original Filed July 17, 1961 2 Sheets-Sheet 1
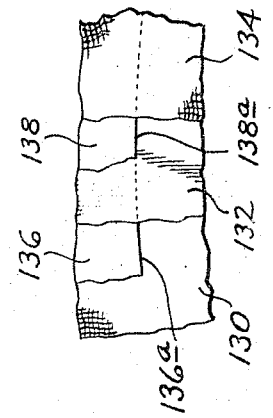
Fig. 2.
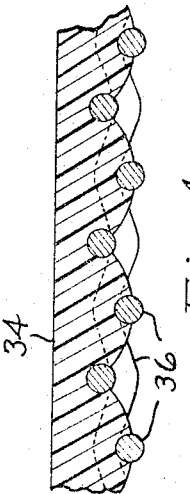
Fig. 9.
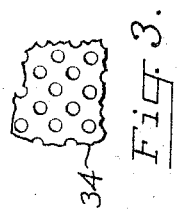
Fig. 3.
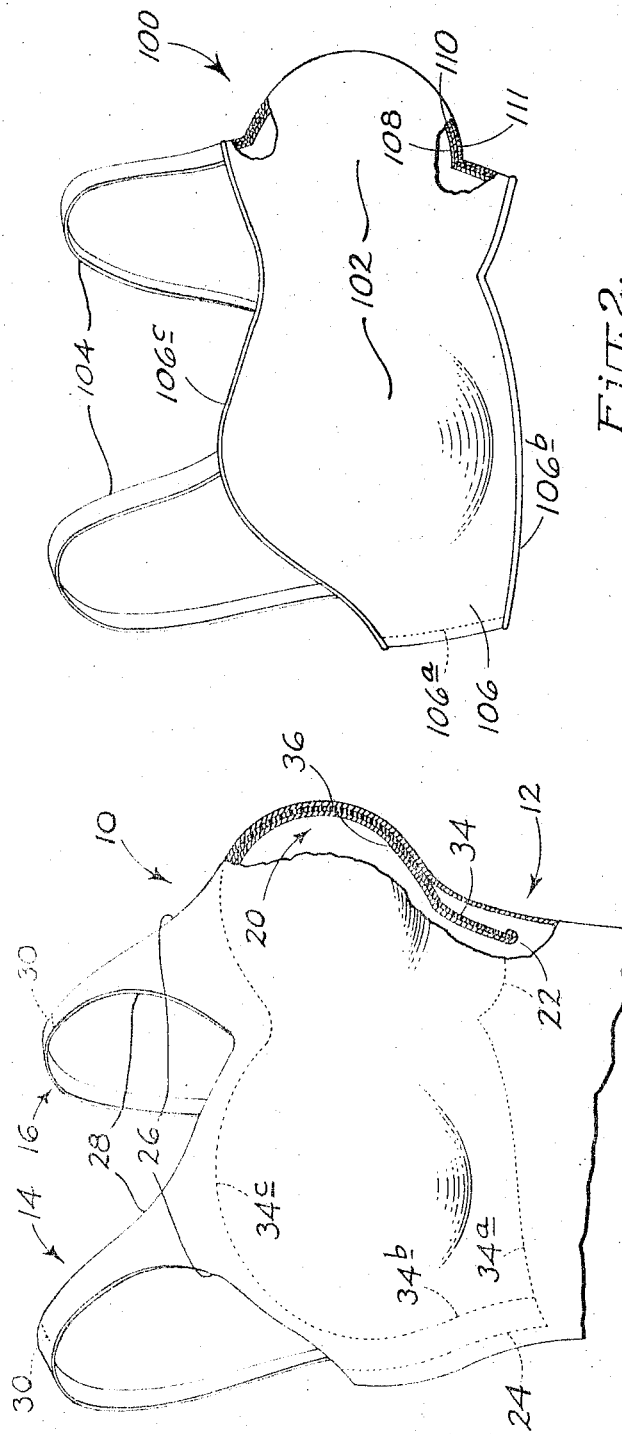
Fig. 1.
Fig. 4.
Bernard I. Galitzki
Robert C. Burbank
INVENTORS
BY
Atty.

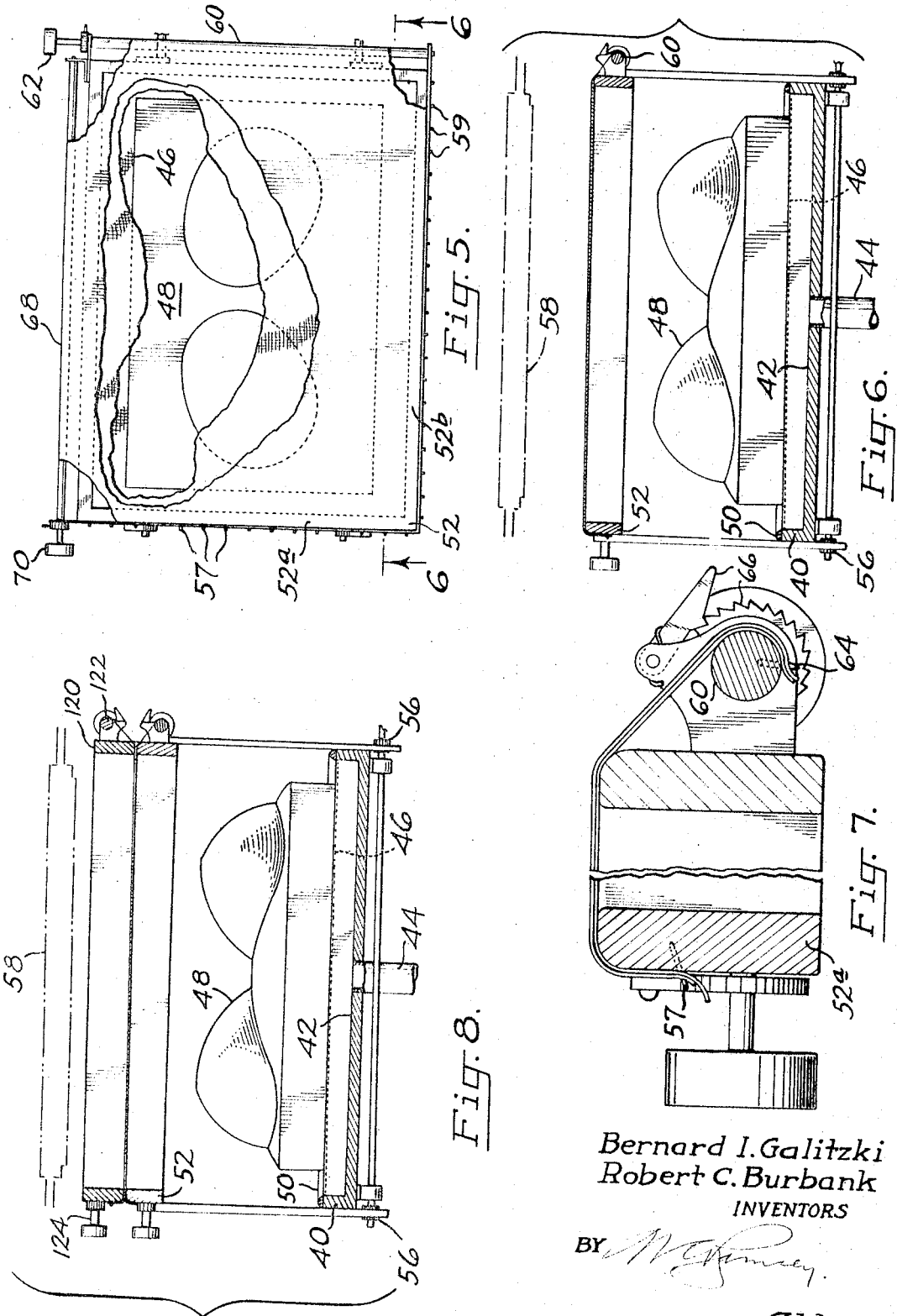

United States Patent Office 3,320,346
Patented May 16, 1967

3,320,346
METHOD OF PRODUCING FABRIC LAMINATED ARTICLES
Bernard I. Galitzki and Robert C. Burbank, both of Portland, Oreg.; said Burbank assignor to Jantzen Inc., a corporation of Nevada
Original application July 17, 1961, Ser. No. 124,610, now Patent No. 3,225,768, dated Dec. 28, 1965. Divided and this application Dec. 23, 1965, Ser. No. 516,029
5 Claims. (Cl. 264—229)

This is a division of application Ser. No. 124,610, filed July 17, 1961, now Patent No. 3,225,768.

This invention relates to laminated fabrics, articles made therefrom, and a process of manufacturing such fabrics. More particularly, the invention relates to laminated fabric articles, where the article over at least a portion of its area is shaped with a three-dimensional curvature, and the article is constructed in such a manner as to resist deformation of such curvature and to tend to re-establish the curvature should the same be deformed. The invention has particular utility in connection with the construction of the three dimensionally curved breast cups in brassieres and similar form-fitting articles of women's clothing.

Considering for the moment brassieres and related breast-supporting and covering structures such as are found in bathing suits, sports clothing and the like (it not being intended in its broadest aspects to be limited to such structures, however), there has been a long-felt need for articles of this description that will render proper support or give proper contour, and that are devoid of stays, seams, braces, etc. The latter produce discomfort, and frequently complicate the construction and increase the expense of an article. In addition, they have the effect of spoiling the smooth contour that is the ultimate result desired. Another factor to be considered in the construction of such articles is that should a breast cup be crushed inadvertently, the same preferably should have sufficient resiliency to recover its original shape. Frequently, as in the case of a bathing suit, the person wearing the suit has no privacy, and it is difficult to adjust a brassiere to proper contour without being the subject of some embarrassment.

A general object of the invention is to provide a novel form-fitting article, such as a brassiere or other breast-covering article, that features a laminated plastic and cloth construction free of seams and stays and having a smooth contour throughout, with the article being entirely satisfactory in rendering proper support and contour.

Another object is to provide such a supporting article, where the article is made of a cloth and plastic laminate, constructed so that it is sufficiently stiff to provide proper contour control, sufficiently flexible to be comfortable, and sufficiently resilient to regain its original shape should it be deformed.

An object related to the above is to provide a brassiere or similar article comprised of a cloth and plastic laminate, where the plastic in the laminate is flexible and has a degree of resiliency, and the cloth selected is a stretchable fabric, preferably one with a longitudinal as well as a transverse stretch, such cloth in the brassiere being stretched and under stress, and operable to produce compressive forces in the plastic layer that is bonded thereto. In the completed brassiere, the stretched fabric resists flattening of the cups therein, and promotes springing of the cups back to their original shape should they be deformed.

Yet another feature and object of the invention is to provide a garment that includes an inner, breast-covering portion with breast cups to be worn over the breasts, where the breast-covering portion is a cloth and plastic laminate, and is held dependently in the garment by a connection with the cloth of the laminate only. If such cloth is stretchable and resilient, a floating type of support within the garment results.

A further object is to provide a novel method of manufacturing a laminated cloth and plastic piece, where a stretchable and resilient cloth is employed in the production of the laminate, and this is stretched and under stress when bonded to the plastic of the laminate, so that on cooling of the plastic after it is formed with proper contour, the cloth is stressed and exerts a compressive force on the plastic layer of the laminate.

In one embodiment of the invention, a laminate comprising an inner cloth layer and an outer plastic layer is contemplated. The cloth on the inside is comfortable against the skin. Such a laminate may be employed, for instance, in making the inner, breast-covering portion of a bathing suit, where the bathing suit proper conceals the breast-covering portion. In another embodiment of the invention, a laminate comprising an inner cloth layer, an intermediate plastic layer, and an outer cloth layer is contemplated. This type of laminate is ideally suited for making such articles as brassieres, where it is preferable not to have exposed plastic.

Other features and objects of the invention will become more fully apparent, as the same is described in conjunction with the accompanying drawings, wherein:

FIG. 1 illustrates an upper portion of a woman's bathing suit, with portions removed, such having an outer, covering layer forming the bathing suit proper, and adapted to be worn over the breasts and within the covering layer a breast-supporting or covering portion constructed as contemplated according to one embodiment of the invention, with such breast-covering portion being an integral part of the suit;

FIG. 2 illustrates a brassiere constructed according to another embodiment of the invention;

FIG. 3 is a view, on a somewhat enlarged scale, illustrating a portion of a plastic sheet employed in making a cloth and plastic laminate;

FIG. 4 is a cross-sectional view of a plastic and cloth laminate, on an even larger scale, illustrating how a mechanical type of bond is produced between the faces of the cloth and plastic in the laminate;

FIG. 5 is a plan view, illustrating somewhat schematically a type of apparatus that may be employed in manufacturing the laminate, and a step in its manufacture;

FIG. 6 is a sectional view, taken along the line 6—6 in FIG. 5, further illustrating the apparatus in FIG. 5;

FIG. 7 is an enlargement of portions of FIG. 6;

FIG. 8 shows apparatus that may be used in making a modified form of laminate; and FIG. 9 illustrates how masking layers may be used in making certain types of laminates, the figure showing a sheet assembly with portions of the various layers in the assembly broken away.

Referring now in particular to FIG. 1, here a woman's bathing suit, generally indicated at 10, is illustrated. The bathing suit represents a typical type of garment, where a breast-covering or supporting portion or element as contemplated by this invention may be utilized. Bathing suit 10 comprises an outer, covering layer of cloth or fabric 12, that provides covering for the body, such covering layer having at the top of the suit straps 14, 16 that are adapted to pass over the shoulders.

Inside covering layer 12, and indicated generally at 20, is a breast-covering portion, having cups adapted to be placed over the breasts and provide support for the breasts. In this particular embodiment, breast-covering portion 20 extends upwardly from a bottom edge 22 and along side edges, such as edge 24, that parallel side seams in the suit, to top edges 26, 28 corresponding to edges in covering layer 12. Portion 20 has upper extremities underlying straps 14, 16, and is sewn to the covering layer at seams 30. These seams coincide with the upper limits of breast-covering portion 20.

The major part of breast-covering portion 20 comprises a cloth and plastic laminate. The plastic layer of this laminate is indicated at 34 and lines 34a, 34b, 34c indicate the outline of this layer. Bonded to the inner face of the plastic layer, throughout the entire expanse of the layer, is a cloth layer indicated at 36. Cloth layer 36 extends laterally and upwardly beyond the side and top edges of plastic layer 34, and its side and top edges are the side edges 24 and top edges 26, 28, 30 of the breast-covering portion 20. Thus, there is an outer margin of cloth extending beyond the sides and top of the plastic layer.

Cloth layer 36 along the bottom of breast-covering portion 20 is turned outwardly over the outside of the plastic layer, as shown in FIG. 1, and this turned-over portion may be sewn in place. Such stitching is not always necessary. Other than this, there is no stitching usually needed between the cloth and plastic layers, the two being held together because of the bond existing between opposed faces of the layers. The breast-covering portion 20 is held in place in the suit by sewing the outer margin of cloth layer 36 to covering layer 12 of the suit along edges 24, 26, 28, and seams 30.

In the manufacture of breast-covering portion 20, a pliable or flexible, and somewhat resilient plastic material is employed, that can be heat-softened, and that on hardening will have formed therein the desired three-dimensional curvature. A stretchable cloth is selected, preferably one having both longitudinal and transverse stretching properties, and one that when stretched is resilient and tends to return to its original shape.

Such stretchable fabrics currently are used widely in the manufacture of such items as socks, tight fitting slacks, support garments, etc. Exemplary of such fabrics are the Helanca fabrics, manufactured from crimped threads that may be stretched out, but when stretched wish to return to their original, crimped state. Fabrics that have elastic yarns therein may also be employed.

In the selection of a plastic material, it is desirable that one with pliability and some resiliency be selected. Preferably a thermoplastic material is used, as this expedites bonding of the cloth to the plastic in the laminate, as will hereinafter be described, without such bonding affecting appreciably the resilient qualities of the fabric in the laminate. In this connection, it has been discovered that elastomeric polyethylene polymers are highly satisfactory, as these are characterized by less stiffness or rigidity than the usual elastomeric vinyl polymers, and have good resistance to crazing, weakening due to flexing, etc. In the usual brassiere or related article, a plastic layer having a thickness ranging between about 15 to 60 mils may advantageously be employed. The plastic layer preferably is perforate, as can be seen with reference to FIG. 3 where such is illustrated, as such increases comfort by providing for some circulation of air therethrough.

In the manufacture of breast-covering portion 20, the apparatus illustrated somewhat schematically in FIGS. 5, 6, and 7 may be employed. In general terms, such apparatus relies upon subatmospheric pressures (or vacuum) for forcing sheet material about a mold to be shaped, and a shiftable frame section movable toward and away from the mold for mounting the sheet material.

With reference now to these figures, the apparatus illustrated comprises a normally stationary, rectangular base frame 40 with a bottom 42. Extending through the bottom is a conduit 44 which is connected to a vacuum source (not shown). Across the top of frame 40 is a screen 46, and a mold 48 of proper contour rests upon this screen. A seal 50 extends about the top edge of frame 40.

Disposed above base frame 40 is a shiftable frame section 52. Such has a rectangular outline coextensive with the outline of frame 40. Frame 52 has an open center, and is shiftable from the raised position shown in FIG. 6 to a position where the base of the frame is against seal 50, using rack and pinion mechanism 56. Above the frame section in its raised position, and indicated by the dashed outline 58, is a heating unit.

Frame section 52 has mounted along sides 52a, 52b a row of pins indicated at 57, 59. These are mounted in fixed position, and have pointed ends projecting outwardly. The pins of a row are employed to anchor one edge of a layer of material engaged thereby. Opposite side 52a is a spindle 60 suitably journaled on the frame section and turned by knob 62. As can be seen with reference to FIG. 7, spindle 60 is provided with a row of pins 64 extending along the length thereof, such being moved in a circular sweep by turning the spindle. At 66 is a pawl and ratchet mechanism inhibiting rotation of the spindle in one direction. A similar spindle 68, provided with a knob 70 is mounted opposite side 52b, such also having a row of pins (not shown) like row of pins 64.

In the manufacture of a breast-covering portion 20, a cloth layer may first be mounted on shiftable frame section 52, by anchoring one edge of a piece of cloth along side 52a using row of pins 57. The edge of the cloth piece adjacent side 52b of the frame may be anchored in a similar manner using row of pins 59. The stretchable cloth is stretched and placed under tension, by securing the edges opposite the anchored edges on the pins of spindles 60, 68, and turning the spindles so as to stretch the cloth. Typically an elongation ranging up to about 10 to 20 percent of the original length of the cloth may be produced in the cloth before the manufacture of the laminate is started.

After suitably positioning the cloth piece, a sheet of plastic may be placed over the cloth, and anchored along the side edges of frame 52 using the various rows of pins described. The spindles may be turned a small additional amount properly to smooth out and flatten the plastic sheet. With the inclusion of the plastic, a sheet assembly is formed comprising the bottom layer of cloth and the top layer of plastic, and this assembly is held on the shiftable frame section with the opposed faces of the two layers closely adjacent.

After properly preparing the sheet assembly, the top layer of plastic is heated by energizing heating unit 58. The plastic is softened by heat, not to such an extent as to make it fluid or tacky, but sufficiently so to enable it to be pressed into the interstices of the cloth layer upon pressing the plastic against the cloth. The precise temperature and heating time used, of course, will vary, depending upon the particular type and thickness of plastic employed. During heating, the plastic shields the cloth layer below it, to keep it from being scorched or otherwise harmed by heat.

Upon the plastic being heat softened, an imperforate flexible covering is placed over the top of the softened plastic, such covering extending over the sides of the frame 52 and being for the purpose of closing off the perforations in the plastic layer so that air is prevented from leaking through the sheet assembly. The covering is made of a material that is inert, that is, a material that will not bond to the plastic below it under the heat and pressures used in the process. The shiftable frame 52 is then lowered onto frame 40, and a vacuum started in conduit 44. When frame section reaches seal 50, the cloth and plastic layers carried by the frame section are firmly pressed against mold 48 by atmospheric pressure. Simultaneously, a bonding together of the cloth and plastic layers, and a shaping of the layers (accompanied with a further stretching of the cloth) occurs. When the plastic has hardened, the laminate just formed may be moved from the shiftable frame section, with relaxation of tension in marginal portions of the cloth layer. The bond formed between the two layers is a mechanical type of bond, as compared to an adhesive bond, and results from the plastic wedging within and filling up the interstices of the cloth layer, as indicated in FIG. 4.

After preparing the laminate, that portion of the plastic that is to be removed in order to shape the outline of the plastic is loosened from the cloth by stripping the plastic from the cloth. Loose plastic may be then trimmed off, with the remaining plastic that is bonded to the cloth having the peripheral outline of the plastic layer in FIG. 1. The remaining margin of cloth extending outwardly from the plastic may then be employed to sew the piece into the bathing suit, as previously described with reference to suit 10 shown in FIG. 1.

Referring now to FIG. 2, a woman's brassiere 100 is illustrated, such being constructed according to another embodiment of the invention. While the two-layer laminate described for breast-covering portion 20 may be employed in the manufacture of a brassiere, in some instances it is desirable to have an outer covering of cloth or fabric in order not to have plastic exposed, and thus a three-layer laminate is illustrated in FIG. 2.

In FIG. 2, brassiere 100 includes cup portions 102, and straps 104 adapted to pass over the shoulders to hold the brassiere in place. A front section or piece 106 of the brassiere is laminated, and such section (that includes cup portions 102) is indicated at 106, such section being bounded by edges 106a, 106b, and 106c. The laminated section comprises an inner cloth layer 108, an intermediate plastic layer 110, and an outer cloth layer 111.

As in the case of the first embodiment discussed, it is contemplated that the plastic layer be a pliable, somewhat resilient plastic, preferably with perforations therein to permit circulation. The cloth layers are stretchable and resilient, and are bonded to the adjacent faces of the plastic layer.

In the manufacture of the laminated section of the brassiere in FIG. 2, apparatus similar to that already discussed may be employed; however, an additional frame such as that indicated in FIG. 8 at 120 is desirable. Referring to FIG. 8, it will be seen that a shiftable frame 52 is provided, and such is over a base frame 40 provided with a conduit 44 for producing subatmospheric pressures above the base frame. At 46 is a screen and at 48 is a mold. Frame section 120 rests on frame 52, and is removable from the top of the frame 52.

Frame 120 is similar to frame section 52 save that it is inverted. It is provided with spindles 122 and 124 for holding onto and pulling adjacent edges of a sheet of cloth, and like frame 52, along the sides of the frame opposite spindles 122, 124 are rows of pins (not illustrated) for anchoring edges of a piece of cloth.

In making the laminated section of brassiere 100, a sheet subassembly is first prepared on the top of shiftable frame 52 by stretching a cloth layer over the frame using the spindles and rows of pins as described in connection with the first embodiment of the invention. Then there is positioned, over the cloth layer, a plastic layer. All this is done with shiftable frame 120 removed from the top of frame 52. While frame 120 is removed from frame 52, a layer of stretched cloth is prepared over the underside of frame 120.

After the sheet subassembly has been prepared, and a cloth sheet stretched over the underside of frame 120, heat is applied to the plastic forming the top of the sheet subassembly, with frame 120 still removed from the machine. This is done by energizing unit 58, and the plastic is heated by the energized unit directly above it. If the plastic were heated with the cloth layer on frame 120 between unit 58 and the plastic, the cloth layer in some instances could be scorched or otherwise harmed. Upon suitably plasticizing the plastic, frame 120 is inserted on top of shiftable frame 52, an inert imperforate covering placed over it (to prevent leakage of air through the plastic and cloth layers), and the two frames then moved together down on base frame 42 until contact is made with seal 50. On the production of subatmospheric pressures below the layers, they are pressed by the pressure of the atmosphere down on the mold as before. On cooling of the plastic layer, a laminate of three layers results, with a mechanical bond between the faces of the plastic layer and the adjacent faces of the cloth layers. The completed brassiere may then be made after stripping any excess plastic cloth from the cloth layers and trimming the plastic to proper contour.

In some instances stripping of the plastic layer from the cloth layer or layers may be difficult or impractical. In this case, bonding between cloth and plastic layers may be prevented, in areas where such bonding is not desired, by inserting a masking layer between the cloth and plastic layers, with such masking layer having an edge that matches the profile desired for the bonded plastic in the finished laminated article. Where a three-layered laminate is prepared, masking layers are included on both sides of the plastic covering matching areas.

Thus, in FIG. 9, 130 indicates a layer of cloth on the underside of a layer of plastic 132, and 134 indicates a layer of cloth superimposed over the plastic. Between the bottom cloth layer 130 and the underside of the plastic layer there is provided a masking layer 136 with an edge 136a matching the profile desired for the bonded plastic in the finished laminated article. Over the top face of the plastic layer and under the upper layer of cloth there is provided another masking layer 138 with an edge 138a shaped as edge 136a. When such an assembly is pressed down upon a mold as previously described, no bonding takes place over those areas covered by the masking layers.

It will be noted that the laminated fabric and garments contemplated by the invention are characterized by a number of unique features. A brassiere may be constructed having a smooth contour that is devoid of seams, stays, and braces where the cups are located. The cups tend to maintain their shape, yet are pliable and flexible. Should the cups in a brassiere be crushed, there is a tendency for the cups to regain their original shape without special adjustment. The fabric in the laminate is without wrinkles. By providing a margin of stretchable cloth extending beyond the boundaries of the laminated portion in a breast-covering element, a type of floating support may be provided the element by sewing the element in place using the protruding margin of cloth.

We claim:

1. In the manufacture of a laminated cloth and plastic piece with three-dimensional curvature in the piece; the method comprising employing a stretchable and resilient cloth as the cloth in the piece and a heat-softenable flexible and resilient plastic as the plastic; preparing a sheet assembly comprising a sheet of the cloth and a sheet of the plastic with the sheet of plastic disposed over one face of the cloth sheet and with the cloth sheet stretched and under tension; forming the sheet assembly with proper three-dimensional curvature by heat softening the plastic sheet to a degree less than one that makes said sheet fluid or tacky, and then shaping the assembly and mechanically bonding together the fabric and plastic sheets in the assembly; then cooling the sheet assembly; and on cooling of the assembly relaxing the tension in the cloth sheet portion of the assembly.

2. In the manufacture of a laminated cloth and plastic piece with three-dimensional curvature in the piece; the method comprising preparing a sheet assembly comprising a sheet of flexible and resilient cloth with the cloth stretched and under tension, and over one face of the cloth a sheet of thermoplastic plastic that is flexible and resilient; heating the plastic sheet to plasticize it to a degree less than one that makes said sheet fluid or tacky and then forming the sheet assembly with proper three-dimensional curvature while simultaneously mechanically bonding the two sheets in the assembly together by pressing the sheet assembly against a mold; then cooling the assembly; and on cooling of the sheet assembly relaxing the tension in the cloth sheet portion of the assembly.

3. The method of claim 2, wherein a masking layer is provided between the sheets of the sheet assembly prior to forming the three-dimensional curvature.

4. In the manufacture of a laminated cloth and plastic piece with three-dimensional curvature in the piece; the method comprising first preparing a sheet subassembly comprising a sheet of stretchable and resilient cloth with the cloth stretched and under tension, and overlying one face of the cloth sheet a sheet of thermoplastic plastic that is flexible and resilient; heating the plastic sheet to plasticize it to a degree less than one that makes said sheet fluid or tacky; superimposing over the exposed face of the plasticized plastic sheet another sheet of cloth that is stretchable and resilient with the cloth stretched and under tension to form a complete sheet assembly; shaping the complete sheet assembly with proper three-dimensional curvature by pressing the assembly against a mold with the plastic sheet at the same time mechanically bonding together with the cloth sheets on either side thereof; then cooling the sheet assembly and on cooling of the assembly relaxing the tension in the various cloth sheets in the assembly.

5. The method of claim 4 where masking layers are provided over matching areas between the plastic sheet and the cloth sheets on either side thereof prior to shaping the sheet assembly.

References Cited by the Examiner

UNITED STATES PATENTS

| | | | |
|---|---|---|---|
| 2,126,832 | 8/1938 | Steinberger | 156—163 XR |
| 2,500,598 | 3/1950 | Akelrod | 264—229 |
| 2,814,007 | 11/1957 | Moncrieff | 264—90 |
| 2,878,153 | 3/1959 | Hacklander | 156—163 XR |
| 2,939,179 | 6/1960 | Penman et al. | 264—291 XR |
| 2,978,376 | 4/1961 | Hulse | 264—257 XR |
| 3,015,598 | 1/1962 | Jones | 264—324 XR |
| 3,070,870 | 1/1963 | Alexander | 264—324 XR |

ROBERT F. WHITE, *Primary Examiner.*

M. R. DOWLING, R. R. KUCIA, *Assistant Examiners.*